(12) United States Patent
Haylock et al.

(10) Patent No.: US 8,475,102 B2
(45) Date of Patent: Jul. 2, 2013

(54) ENHANCED CONDUCTIVITY SLEEVED FASTENER AND METHOD FOR MAKING SAME

(75) Inventors: Luke Haylock, Culver City, CA (US); Rodrigo Pinheiro, Riverside, CA (US); Hasim Mulazimoglu, Buena Park, CA (US); Michael March, Torrance, CA (US)

(73) Assignee: Alcoa Inc., Pittsburgh, PA (US)

(*) Notice: Subject to any disclaimer, the term of this patent is extended or adjusted under 35 U.S.C. 154(b) by 214 days.

(21) Appl. No.: 12/908,347

(22) Filed: Oct. 20, 2010

(65) Prior Publication Data
US 2011/0142567 A1   Jun. 16, 2011

Related U.S. Application Data

(60) Provisional application No. 61/279,548, filed on Oct. 22, 2009.

(51) Int. Cl.
*F16B 19/00* (2006.01)

(52) U.S. Cl.
USPC .............................. 411/361; 411/69; 411/914

(58) Field of Classification Search
USPC .......................................... 411/69, 361, 914
See application file for complete search history.

(56) References Cited

U.S. PATENT DOCUMENTS

| | | | |
|---|---|---|---|
| 2,396,661 A | 1/1944 | Keller et al. | |
| 2,501,567 A | 3/1950 | Huck | |
| 2,940,787 A * | 6/1960 | Goodner | 403/47 |
| 3,041,912 A | 7/1962 | Krieder et al. | |
| 3,215,024 A | 11/1965 | Brilmyer et al. | |
| 3,271,058 A | 9/1966 | Anderson | |
| 3,304,109 A | 2/1967 | Schuster | |
| 3,464,306 A * | 9/1969 | Orloff et al. | 411/361 |
| 3,535,911 A | 10/1970 | Armstrong | |
| 3,792,933 A | 2/1974 | Stencel | |
| 3,820,297 A | 6/1974 | Hurd | |
| 3,835,615 A | 9/1974 | King | |

(Continued)

FOREIGN PATENT DOCUMENTS

| EP | 0 248 122 A2 | 9/1987 |
|---|---|---|
| EP | 0 248 122 | 12/1987 |

(Continued)

OTHER PUBLICATIONS

European Search Report from European Patent No. 07 11 6776 dated Jul. 23, 2008 (2 pgs).

(Continued)

*Primary Examiner* — Flemming Saether
(74) *Attorney, Agent, or Firm* — Greenberg Traurig, LLP

(57) ABSTRACT

A sleeve interference fastener adapted to be installed in a hole of a structure includes a sleeve; a pin member, wherein the pin member has a transition zone between a shank portion and a locking portion and wherein a portion of the pin member comprises a low friction dielectric coating; a locking member; wherein, in the installed position, a first interface between the shank portion of the pin member and the sleeve is substantially free from the low friction dielectric coating, and wherein, in the installed position, the transition zone of the pin member and a second interface between the locking portion of the pin member and the locking member are substantially covered with the low friction dielectric coating.

13 Claims, 13 Drawing Sheets

U.S. PATENT DOCUMENTS

| | | | |
|---|---|---|---|
| 3,915,052 A | 10/1975 | Ruhl | |
| 3,949,535 A | 4/1976 | King, Jr. | |
| 3,953,906 A | 5/1976 | Brown | |
| 3,965,792 A | 6/1976 | King, Jr. | |
| 4,048,898 A | 9/1977 | Salter | |
| 4,102,030 A | 7/1978 | King, Jr. | |
| 4,164,807 A | 8/1979 | King, Jr. | |
| 4,244,661 A | 1/1981 | Dervy | |
| 4,405,256 A | 9/1983 | King, Jr. | |
| 4,472,096 A | 9/1984 | Ruhl et al. | |
| 4,479,163 A | 10/1984 | Bannink, Jr. et al. | |
| 4,502,092 A | 2/1985 | Bannink, Jr. et al. | |
| 4,557,033 A | 12/1985 | Champoux | |
| 4,628,402 A | 12/1986 | Covey | |
| 4,702,655 A | 10/1987 | Kendall | |
| 4,755,904 A | 7/1988 | Brick | |
| 4,760,493 A | 7/1988 | Pearson | |
| 4,789,283 A | 12/1988 | Crawford | |
| 4,813,834 A | 3/1989 | Smith et al. | |
| 4,850,771 A | 7/1989 | Hurd | |
| 4,867,625 A | 9/1989 | Dixon | |
| 4,891,732 A | 1/1990 | Jones | |
| 4,905,931 A | 3/1990 | Covey | |
| 4,943,196 A | 7/1990 | Dahl | |
| 5,018,920 A | 5/1991 | Speakman | |
| 5,129,253 A | 7/1992 | Austin et al. | |
| 5,176,481 A | 1/1993 | Schiefer | |
| D372,857 S | 8/1996 | Hirai | |
| 6,149,363 A | 11/2000 | March | |
| 6,499,926 B2 | 12/2002 | Keener | |
| 6,589,918 B2 | 7/2003 | Denpo et al. | |
| 6,659,699 B2 | 12/2003 | Stoewer et al. | |
| 6,665,922 B2 | 12/2003 | Schultz | |
| 7,050,286 B2 | 5/2006 | Pridham et al. | |
| 7,236,343 B2 | 6/2007 | Heidlebaugh et al. | |
| 7,277,266 B1 | 10/2007 | Le et al. | |
| 7,307,825 B2 | 12/2007 | De La Fuente De Ana et al. | |
| 7,326,015 B2 * | 2/2008 | Reynolds, Jr. | 411/424 |
| 7,525,785 B2 | 4/2009 | Rawlings | |
| 7,554,785 B2 | 6/2009 | Hawley | |
| 7,599,164 B2 | 10/2009 | Heeter et al. | |
| 7,695,226 B2 | 4/2010 | March et al. | |
| 7,721,990 B2 | 5/2010 | Jaeger et al. | |
| 7,738,236 B2 | 6/2010 | Stein | |
| 7,755,876 B2 | 7/2010 | Morrill et al. | |
| 7,869,181 B2 | 1/2011 | Le | |
| 7,898,785 B2 | 3/2011 | Winter et al. | |
| 2002/0119028 A1 | 8/2002 | Brown et al. | |
| 2004/0091331 A1 | 5/2004 | Schultz | |
| 2005/0144874 A1 | 7/2005 | West et al. | |
| 2007/0041143 A1 | 2/2007 | Georgeson et al. | |
| 2007/0111909 A1 | 5/2007 | Combetta | |
| 2007/0177330 A1 | 8/2007 | Ackerman et al. | |
| 2008/0240925 A1 | 10/2008 | Kita et al. | |
| 2009/0060666 A1 | 3/2009 | Georgeson et al. | |
| 2009/0159306 A1 | 6/2009 | Loche et al. | |
| 2009/0178262 A1 | 7/2009 | Reid et al. | |
| 2010/0125572 A1 | 5/2010 | Poblete et al. | |
| 2010/0219287 A1 | 9/2010 | Sanchez-Brunete Alvarez et al. | |
| 2010/0260572 A1 | 10/2010 | Wehrmeister et al. | |
| 2010/0272537 A1 | 10/2010 | Haylock et al. | |
| 2010/0276536 A1 | 11/2010 | Lambert et al. | |
| 2010/0277849 A1 | 11/2010 | Morrill et al. | |
| 2011/0056718 A1 | 3/2011 | Gattus et al. | |

FOREIGN PATENT DOCUMENTS

| | | |
|---|---|---|
| EP | 0 468 563 | 1/1992 |
| EP | 0 468 563 A1 | 1/1992 |
| EP | 1 903 221 A1 | 3/2008 |
| EP | 1 903 221 | 6/2008 |
| JP | 7-151111 | 6/1995 |
| WO | 87/05976 | 10/1987 |
| WO | 2008/036666 | 3/2008 |

OTHER PUBLICATIONS

International Search Report and Written Opinion from International Appln. No. PCT/US10/29758 mailed Jul. 9, 2010.

International Search Report issued in connection with International Appln. No. PCT/US07/78775.

Written Opinion issued in connection with International Appln. No. PCT/US07/78775.

International Search Report and Written Opinion issued in connection with applicants' International Patent Application No. PCT/US2010/053342 entitled "Enhanced Conductivity Sleeved Fastener and Method for Making Same" (11 pages).

Notice of Opposition of European Patent Application No. 07116776.1, including English-language translation, filed Jan. 6, 2012.

ASTM International, "Standard Guide for Measuring and Reporting Friction Coefficients", Nov. 2008, pp. 1-12.

Huck International, Inc. "Huck Aerospace Fasteners for Composite Structure", © 1992.

"Guide d'emploi des traitements de surfaces appliqués aux problémes de frottement", including its English-language translation, © Technique and Documentation, 2000.

Huck Manufacturing Company, "Lightweight (GP) Interference Fit Fastener for Composite Materials", Apr. 1984.

Military Specification, Lubricant, Solid Film, Heat Cured, Corrosion Inhibiting, Nato Code No. S-1738, MIL-L-8937D, Mar. 29, 1982 superseding MIL-L-8937C, Mar. 18, 1976.

Rockwell International, Space Systems Division, "Preload Measurement in Sleeve Bolts Using an Ultrasonic Technique", Feb. 1996, by Ajay Koshti.

Oak Ridge Laboratory, Metals and Ceramics Division, "Friction and Wear of Titanium Alloys Sliding Against Metal, Polymer, and Ceramic Counterfaces", by Jun Qu, el al., Nov. 11, 2004.

Wroclow University of Technology, Department of Mechanical Engineering, "The Statistical Correlation of the Coefficient of Friction and Wear Rate of PTFE Composites with Steel Counterface Roughness and Hardness", Wojciech Wielaba, 2002.

International Search Report and Written Opinion for International Patent Application No. PCT/US07/78775 (7 pages).

International Search Report and Written Opinion for International Patent Application No. PCT/US2010/029758 (12 pages).

* cited by examiner

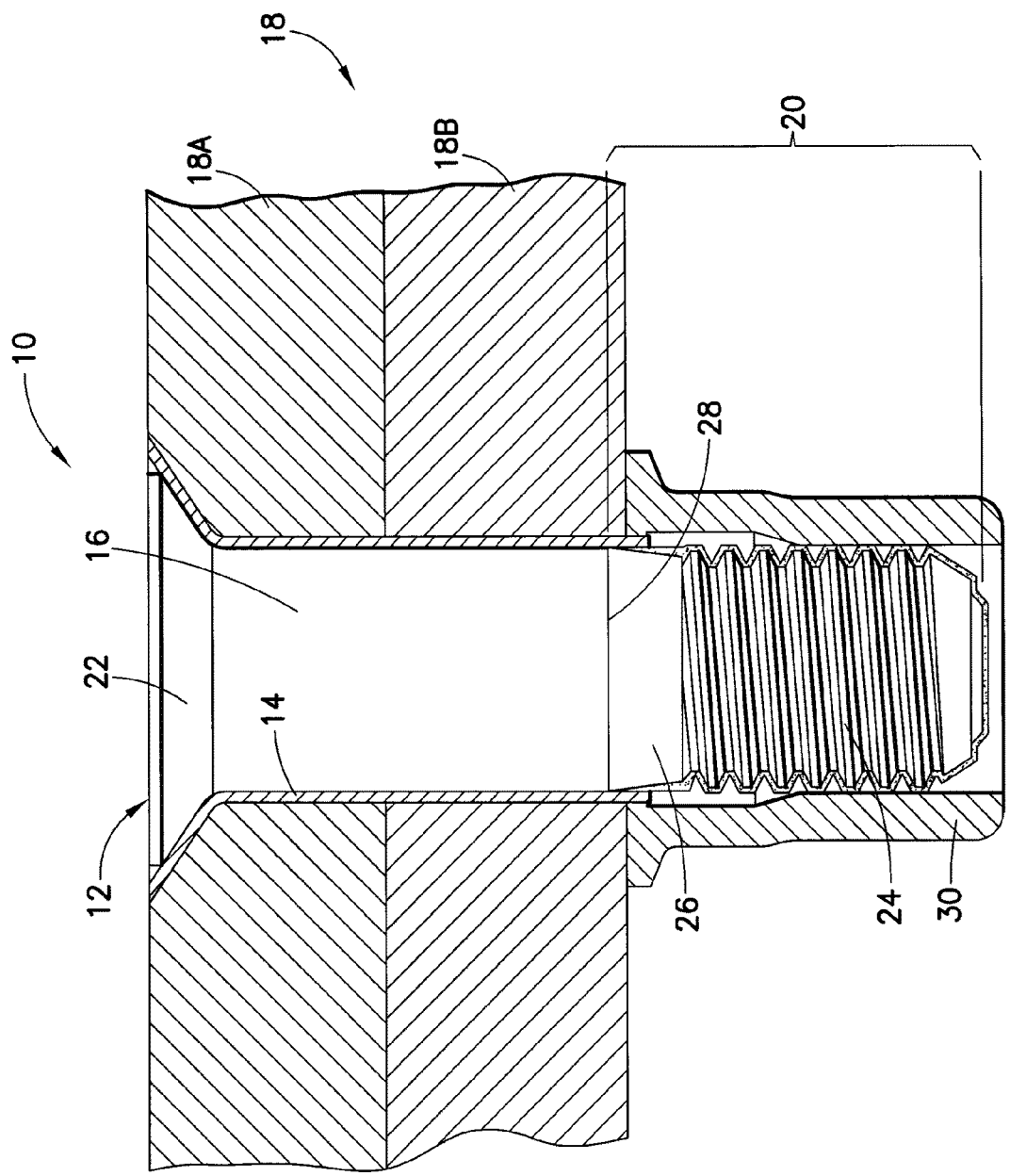

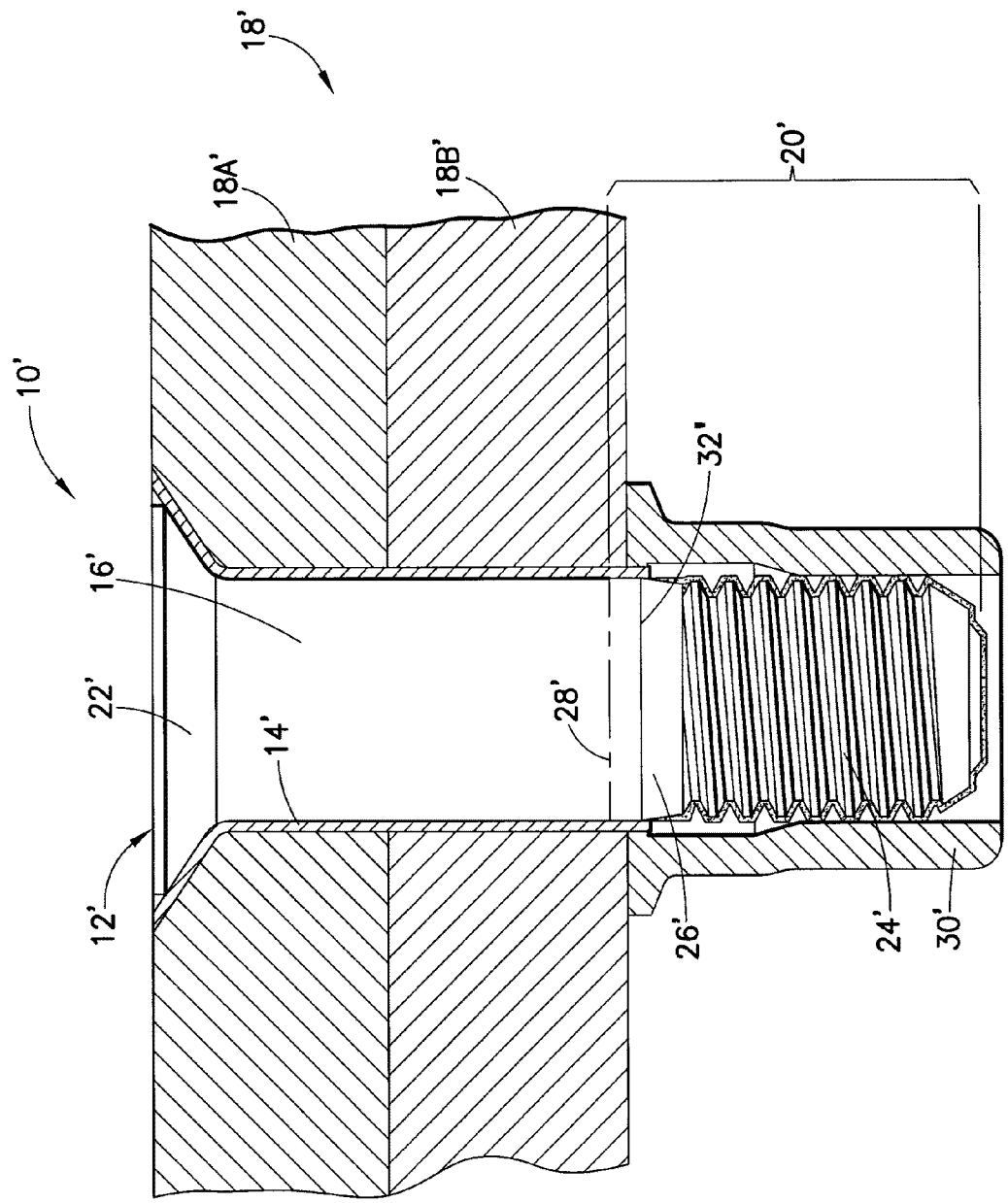

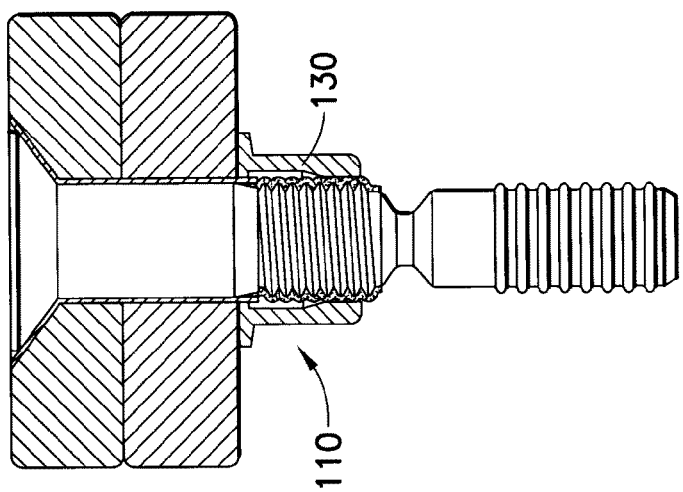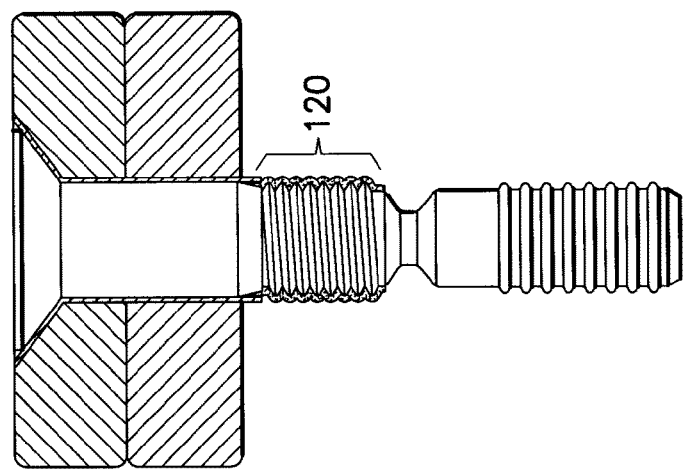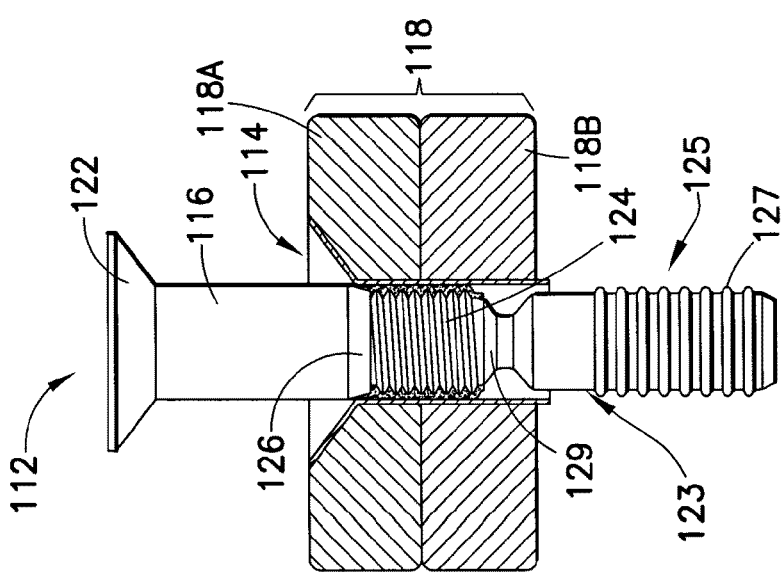

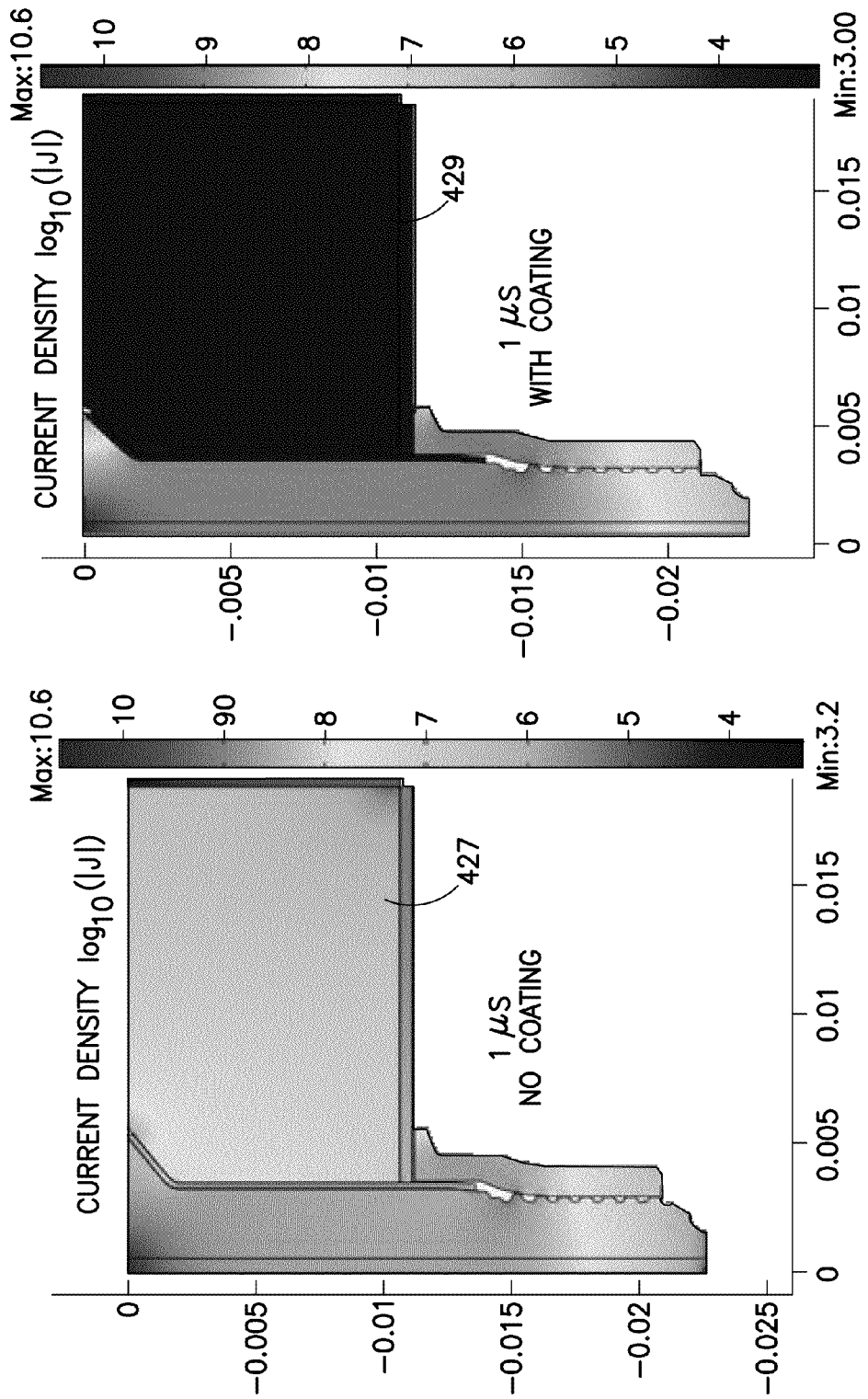

ENHANCED CONDUCTIVITY SLEEVED FASTENER AND METHOD FOR MAKING SAME

RELATED APPLICATIONS

This application claims the benefit of U.S. provisional application Ser. No. 61/279,548 filed Oct. 22, 2009, and entitled "ENHANCED CONDUCTIVITY SLEEVED FASTENER AND METHOD FOR MAKING," which is hereby incorporated by reference herein in its entirety for all purposes.

FIELD OF THE INVENTION

The present invention relates to mechanical fasteners and, more particularly, to mechanical fasteners having enhanced electrical conductivity.

BACKGROUND OF THE INVENTION

Structures, such as aircraft, require numerous mechanical fasteners. Aircraft are susceptible to lighting strikes. What is needed are mechanical fasteners having enhanced electrical conductivity to resist electrical damage, especially from lightning strikes.

SUMMARY OF THE INVENTION

In an embodiment, a sleeved fastener assembly that provides electrical conductivity between a sleeve and a shank portion of a core pin which corresponds to a composite structure, and including a dielectric, low friction coating applied to other portions of the core pin, such as a threaded portion and a transition zone of the core pin. In an embodiment, the shank portion provides a bare metal-to-metal contact between the sleeve and the core pin. This reduces the electrical resistance and the current density along the sleeve/core pin interface by encouraging the current to be shared along the whole contact surface. In the embodiment, the presence of the dielectric, low friction coating between the locking portion of the core pin and a mating collar or nut increases the electrical resistance greatly across this interface, which inhibits the flow of electrical current. In an embodiment, the instant invention provides for a differential of electrical resistivity between the bare metal shank portion of the core pin and the portions of the core pin that are coated with the dielectric, low friction coating. In an embodiment, where there is a selective coating application, the majority of the electrical current (such as from lightning) will be kept at the bare metal shank portion of the core pin, which is not coated with the dielectric, low friction coating. The electrical current will then naturally flow through the path of least resistance, so that the current will dissipate into the structure across the shank portion of the fastener.

In an embodiment, a sleeve interference fastener adapted to be installed in a hole of a structure includes a.) a sleeve having a head at one end and a tubular portion, the tubular portion having an inner diameter and an outer diameter, wherein the outer diameter of the tubular portion is less than an inner diameter of the hole of the structure; b.) a pin member having a pin head at one end, a locking portion at an opposite end, and a shank portion intermediate the pin head and the locking portion, i) wherein the shank portion, located below the pin head, has a diameter greater than the inner diameter of the tubular portion of the sleeve, ii) wherein the pin member has a transition zone between the shank portion and the locking portion, and iii) wherein a portion of the pin member comprises a low friction dielectric coating; c.) a locking member adapted to fit over the locking portion of the pin member; d.) wherein the sleeve is adapted to expand radially over the shank portion of the pin member to form an interference fit between the outer diameter of the sleeve and the hole of the structure so as to provide an installed position; e.) wherein, in the installed position, a first interface between the shank portion of the pin member and the inner diameter of the sleeve is substantially free from the low friction dielectric coating; and f) wherein, in the installed position, the transition zone of the pin member and a second interface between the locking portion of the pin member and the locking member are substantially covered with the low friction dielectric coating.

In an embodiment, a method for controlling a passage of electrical charge through an interference fastener adapted to be installed in a hole of a structure includes: a.) providing a sleeve having a head at one end and a tubular portion, the tubular portion having an inner diameter and an outer diameter, wherein the outer diameter of the tubular portion is less than an inner diameter of the hole of the structure; b.) providing a pin member having a pin head at one end a locking portion at an opposite end, and a shank portion intermediate the pin head and the locking portion, i) wherein the shank portion, located below the pin head, has a diameter greater than the inner diameter of the tubular portion of the sleeve, ii) wherein the pin member has a transition zone between the shank portion and the locking portion, and iii) wherein a portion of the pin member comprises a low friction dielectric coating; c.) providing a locking member adapted to fit over the locking portion of the pin member; d.) wherein the sleeve is adapted to expand radially over the shank portion of the pin member to form an interference fit between the outer diameter of the sleeve and the hole of the structure so as to provide an installed position; e.) wherein, in the installed position, a first interface between the shank portion of the pin member and the inner diameter of the sleeve is substantially free from the low friction dielectric coating; f) wherein, in the installed position, the transition zone of the pin member and a second interface between the locking portion of the pin member and the locking member are substantially covered with the low friction dielectric coating; and g) wherein, in the installed position, using portions of the fastener with and without the low friction dielectric coating to direct the passage of the electrical charge.

In an embodiment, the pin member and the sleeve member are sufficiently adapted to result in: (i) a coefficient of friction between a shank contact surface of a surface of the inner diameter of the sleeve and the shank portion of the pin member having X, (ii) a coefficient of friction between a surface of the outer diameter of the sleeve and the inner diameter of the hole of the structure having Y, and (iii) wherein X is consistently maintained less than Y when the shank portion of the pin member is moved within the sleeve.

In an embodiment, the locking member is a collar.

In an embodiment, the locking member comprises a counterbore portion, wherein the counterbore portion is adapted to fit over the locking portion of the pin member and compress the sleeve around the pin member.

In an embodiment, the interference fit of the fastener with the structure is about 0.0005 inches to about 0.0100 inches.

In an embodiment, the shank portion of the pin member is cylindrical.

In an embodiment, the structure is a metallic-composite structure.

In an embodiment, the fastener is made from at least one material selected from the group consisting of aluminum, titanium, and steel.

In an embodiment, the low friction dielectric coating includes a surface resistivity of about $1\times10^{10}$ Ω/Sq to about $1\times10^{12}$ Ω/Sq.

In an embodiment, a thickness of the low friction dielectric coating in the transition zone and the second interface is within a range of about 0.0003 inch to about 0.0006 inch.

In an embodiment, a friction coefficient of the low friction dielectric coating is in a range of about 0.25 to about 0.44.

In an embodiment, the low friction dielectric coating comprises a metal material.

In an embodiment, the shank portion of the pin member is coated with at least one other coating that differs in at least one property from the low friction dielectric coating.

In an embodiment, during insertion of the core pin through the sleeve, the apex of the transition zone is the point of highest contact pressure. In an embodiment, the dielectric, low friction coating reduces the friction coefficient between the core pin and the sleeve at the apex of the transition zone and reduces the load required to insert the core pin through the sleeve.

BRIEF DESCRIPTION OF THE DRAWINGS

Reference is made to the following detailed description of the exemplary embodiments considered in conjunction with the accompanying drawings, in which:

FIGS. 2A and 2B are cross-sectional views of embodiments of a fastener of the present invention in an installed position that may utilize the core pin shown in FIG. 1;

FIGS. 3A-3C are illustrations of an installation sequence for some embodiments of sleeved fasteners of the instant invention;

FIGS. 4A and 4B show simulations of the current density distribution in a structure comparing a core pin that is fully coated with a dielectric coating and a core pin that is not fully coated;

The drawings shown are not necessarily to scale, with emphasis instead generally being placed upon illustrating the principles of the present invention. Further, some features may be exaggerated to show details of particular components. While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art, which fall within the scope and spirit of the principles of the presently disclosed invention. In addition, any measurements, specifications and the like shown in the figures are intended to be illustrative, and not restrictive.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Therefore, specific structural and functional details disclosed herein are not to be interpreted as limiting, but merely as a representative basis for teaching one skilled in the art to variously employ the present invention.

In one embodiment of the present invention, a sleeved fastener is used to achieve fastener-to-hole intimacy. In one example, this approach involves inserting a close fitting sleeve in the hole of a structure. An interference-fit pin, commonly referred to as a core pin, with an internal diameter which is larger that the inner diameter of the sleeve is then inserted into the sleeve. This expands the sleeve to bring it in intimate contact with the wall of the hole.

Figure 1:
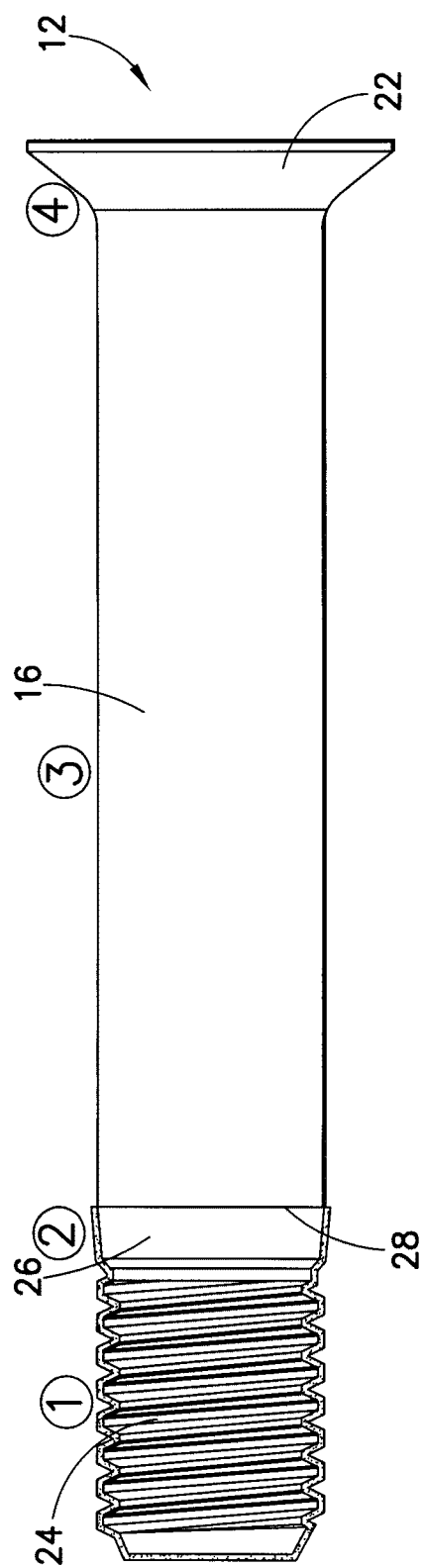
FIG. 1 is an elevational view of a core pin employed by an embodiment of a fastener of the present invention.

In some embodiments, illustrated in FIGS. 1 and 2A, a sleeved fastener assembly 10 includes a core pin 12 and a sleeve 14 with sufficient electrical conductivity between the sleeve 14 and a shank portion 16 of the core pin 12 which corresponds to a structure 18, but with a dielectric, low friction coating 20 on other portions of the core pin 12. In an embodiment, FIG. 1 illustrates the anatomy of the core pin 12. In an embodiment, the shank portion 16 [also labeled as zone "3"] and a head portion 22 [also labeled as zone "4"] of the core pin 12 which corresponds to the structure 18 has sufficient electrical conductivity. In an embodiment, by contrast, a locking portion 24 of the core pin 12 which does not correspond to the structure 18 [with the locking portion 24 also labeled as zone "1"] and a transition zone or portion 26 [also labeled as zone "2"] are both coated with a low friction, dielectric coating 20 as illustrated in FIG. 2A.

In some embodiments, the phrase "low fiction dielectric coating" as used herein includes a coating having a surface resistivity within a range of about $1\times10^{10}$ Ω/Sq. to about $1\times10^{12}$ Ω/Sq. and a coefficient of friction within a range of about 0.25 to about 0.44. In some embodiments, the phrase "low fiction dielectric coating" as used herein includes a coating having a surface resistivity within a range of about $1\times10^{11}$ Ω/Sq. to about $1\times10^{12}$ Ω/Sq. and a coefficient of friction within a range of about 0.20 to about 0.35. In some embodiments, the phrase "low fiction dielectric coating" as used herein includes a coating having a surface resistivity within a range of about $9\times10^{10}$ Ω/Sq. to about $9\times10^{12}$ Ω/Sq. and a coefficient of friction within a range of about 0.15 to about 0.50. In some embodiments, the phrase "low fiction dielectric coating" as used herein includes a coating having a surface resistivity within a range of about $1\times10^{10}$ Ω/Sq. to about $1\times10^{13}$ Ω/Sq. and a coefficient of friction within a range of about 0.25 to about 0.44.

Referring to FIGS. 1 and 2A, in some embodiments, the fastener assembly 10 has a dielectric, low friction coating 20 on other portions of the core pin 12. In some embodiments, the phrase "sufficient electrical conductivity" as used herein includes a surface conductivity within a range of about $1\times10^{-5}$ Ωm to about $1\times10^{-8}$ Ωm. In some embodiments, the phrase "sufficient electrical conductivity" as used herein includes a surface conductivity within a range of about $1\times10^{-6}$ Ωm to about $1\times10^{-8}$ Ωm. In some embodiments, the phrase "sufficient electrical conductivity" as used herein includes a surface conductivity within a range of about $1\times10^{-7}$ Ωm to about $1\times10^{-8}$ Ωm. In some embodiments, the phrase "sufficient electrical conductivity" as used herein includes a surface conductivity within a range of about $9\times10^{-6}$ Ωm to about $9\times10^{-8}$ Ωm.

In an embodiment, the core pin 12 includes the shank portion 16 and the head portion 22. In an embodiment, in an installed condition (e.g. FIG. 2A) the shank portion 16 and the head portion 22, which generally correspond to the structure 18 made of work pieces 18A and 18B, have sufficient electrical conductivity. In some embodiments, by contrast, the locking portion 24 of the core pin 12, which does not correspond to the structure 18 (i.e. positioned substantially outside of the structure 18), and the transition zone 26 of the pin 12 are both coated with a low friction, dielectric coating 20 (as illustrated for example in FIG. 2A).

In an embodiment, the fastener assembly 10 is made at least in part from aluminum. In an embodiment, the fastener assembly 10 is made at least in part from an alloy steel. In an embodiment, the fastener assembly 10 is made at least in part from corrosion resistant steel. In an embodiment, the fastener assembly 10 is made at least in part from titanium. In an embodiment, the fastener assembly 10 is made at least in part from other materials known in the art.

In an embodiment, the low friction, dielectric coating 20 includes an aluminum pigmented polymer based coating. In an embodiment, the coating 20 includes HI-KOTE™ aerospace coatings, such as HI-KOTE 1™, HI-KOTE 2™, or HI-KOTE 4™, manufactured by Hi-Shear Corporation of Torrance, Calif., whose properties are described in detail at http://www.hi-shear.com/fastener_hi-kote.htm, and are incorporated by reference herein. In an embodiment, the coating 20 can be supplied by other manufacturers. In an embodiment, the coating 20 includes a surface resistivity of about $1.7\times10^{10}$ Ω/Sq. In an embodiment, the coating 20 includes a surface resistivity within a range of about $1\times10^{10}$ Ω/Sq. to about $1\times10^{12}$ Ω/Sq. In an embodiment, the coating 20 includes a friction coefficient of about 0.32. In an embodiment, the coating 20 includes a coefficient of friction within a range of about 0.25 to about 0.44.

In an embodiment, the coating 20 has a thickness within a range of about 0.0003 inch to about 0.0006 inch. In an embodiment, the coating 20 has a thickness within a range of about 0.0001 inch to about 0.0010 inch. In an embodiment, the coating 20 has a thickness within a range of about 0.0004 inch to about 0.0006 inch. In an embodiment, the coating 20 has a thickness within a range of about 0.0003 inch to about 0.0005 inch. In an embodiment, the coating 20 has a thickness within a range of about 0.0003 inch to about 0.0008 inch. In an embodiment, the coefficient of friction is measured using ASTM D-2670, which is the standard test method for measuring wear properties of fluid lubricants (Falex Pin and Vee Block Method), or any other comparable test.

In an embodiment, the low friction, dielectric coating 20 is applied to the portions 24, 26 of the core pin 12 by masking the bare metal shank portion 16 (which will not be coated) and spraying the portions 24, 26 with the coating 20. In an embodiment, the bare metal shank portion 16 is masked or housed within a structure, leaving the portions 24, 26 exposed for coating.

In an embodiment, the shank portion 16 of the core pin 12 is coated with paraffin wax. In an embodiment, the paraffin wax coating is removed from the core pin 12 when the core pin 12 is inserted within the sleeve 14. In an embodiment, the shank portion 16 of the core pin 12 is coated with a material, such as gold or silver or any other comparable metal, to enhance the conductivity of the shank portion 16.

In an embodiment, the sleeve 14 includes a coating on its exterior surface for deforming into the texture of the composite structure. In an embodiment, the coating on the exterior surface of the sleeve includes a metallic coating. In an embodiment, the metallic coating is silver. In another embodiment, the metallic coating is nickel. In another embodiment, the sleeve 14 includes a coating on its interior surface to provide low friction therein, which is described within U.S. Pat. No. 7,695,226 to March et al., issued on Apr. 13, 2010, the disclosure of which is incorporated by referenced herein in its entirety. In another embodiment, the sleeve 14 includes a coating(s) on both its interior or exterior surfaces.

In an embodiment, during insertion of the core pin 12 through the sleeve 14, an apex 28 of the transition zone 26 is the point of highest contact pressure. The dielectric, low friction coating 20 reduces the friction coefficient between the core pin 12 and the sleeve 14 at this location and reduces the load required to insert the core pin 12 through the sleeve 14.

In an embodiment, the dielectric low friction coating 20 on the portions 24, 26 of the core pin 12 which corresponds to a locking member, such as a threaded nut or a collar (i.e., zones "1" and "2"), also increases the voltage drop across the core pin 12 to the collar or nut interface. While the shank portion 16 and head portion 22 of the core pin 12 (i.e., zones "3" and "4") facilitate current flow across the portion of the core pin 12 which corresponds to the structure 18. This configuration effectively controls the path of current flow across the shank portion 16 of the fastener assembly 10 and into the structure 18 rather than toward the locking member 30.

In an embodiment, the fastener assembly 10 includes a straight shank sleeved fastener. In an embodiment, the fastener assembly 10 includes a lockbolt variant with a mating swage collar. In an embodiment, the fastener assembly 10 includes a threaded pin variant with a mating nut. In an embodiment, the fastener assembly 10 includes a threaded pin with mating frangible collars. In an embodiment, the fastener assembly 10 includes a hybrid variant which can be installed with a mating swage collar or a threaded nut. In an embodiment, the fastener assembly 10 includes a tapered shank sleeved fastener.

In one specific embodiment, the core pin 12 includes the elongated smooth cylindrical shank portion 16 and the enlarged head portion 22 for mating with the sleeve 14. In some embodiments, the head portion 22 is a countersink or protruding head for engagement with a flared end of the sleeve 14.

In further embodiments, the sleeve 14, which is adapted to fit over the smooth cylindrical shank portion 16, includes a tubular portion and an enlarged end for engagement with the outer surface of the structure 18. In some embodiments, there is a flared end for engagement with the countersink portion in the structure 18. In an embodiment, the sleeve 14 has a length greater than the maximum total thickness of the structure 18 to be joined at the location of the aligned holes. In an embodiment, the tubular portion of the sleeve 14 has an inner diameter less than the diameter of the smooth cylindrical shank portion 16 and an outer diameter sized to permit fitting of the sleeve 14 into the aligned clearance holes of workpieces in the structure 18.

In one aspect of an embodiment, the core pin 12 has the smooth cylindrical shank portion 16 with a diameter greater than the maximum inner diameter of the sleeve 14. When the smooth cylindrical shank portion 16 enters into and pulls through the sleeve 14, the sleeve 14 radially expands into an interference fit with the walls of the holes of the work pieces 18A, 18B.

In an embodiment, the fastener assembly 10 may be used in aircraft, such as commercial or private aircraft. In an embodiment, the fastener assembly 10 may be used in conjunction with other types of structural components.

Referring back to FIG. 2A, it illustrates one embodiment of the present invention by showing a cross section of the fastener assembly 10 in an installed position. In an embodiment, the portion of the core pin 12 which corresponds to the structure 18 is not coated with the dielectric, low friction coating 20, while the portion of core pin 12 which does not correspond with the structure 18 is selectively coated with a dielectric, low friction coating 20. In an embodiment, the portion of the core pin 12 that is not coated with the dielectric, low friction coating 20 (i.e., the bare metal shank portion 16) provides a direct bare metal-to-metal contact between sleeve 14 and the core pin 12. As used herein, the term "bare metal" means a metallic surface having substantially no coating or a metallic surface having a metallic coating thereon which is not a low fiction dielectric coating. In some embodiments, such direct, bare metal contact reduces the electrical resistance and the current density along the sleeve/pin interface by encouraging the current to be shared along the whole contact surface while the presence of the dielectric low friction coating 20 between the locking portion of the core pin 12 and the locking member 30 increases the electrical resistance greatly across this interface, which inhibits the flow of electrical current. This results in a differential of electrical resistivity between the bare metal shank portion 16 of the core pin 12 and the portions 24, 26 of the core pin 12 that are coated with the dielectric, low friction coating 20. In an embodiment, the electrical conductivity of the bare metal shank portion 16 of the core pin 12 is within a range of about $1 \times 10^{-8}$ Ωm to about $1 \times 10^{-8}$ Ωm, while the resistivity of the portions 24, 26 of the core pin 12 that are coated with the dielectric, low friction coating 20 is within a range of about $1 \times 10^{10}$ Ωm to about $1 \times 10^{15}$ Ωm. In an embodiment, the conductivity of the bare metal shank portion 16 of the core pin 12 is measured using ASTM E1004-09, which is the standard test method for determining electrical conductivity using the electromagnetic (eddy-current) method, or any other comparable test. In an embodiment, the resistivity of the portions 24, 26 of the core pin 12 that is coated with the dielectric, low friction coating 20 is measured using ASTM F-150, which is the standard test method for electrical resistance of conductive resilient flooring, or any other comparable test.

With the aforesaid selective coating application, the majority of the lightning current will be kept at the bare metal shank portion 16 of the core pin 12. The electrical current will then naturally flow through the path of least resistance and dissipate into the structure 18 across the shank portion 16 of the fastener assembly 10, which is not coated, since this portion has a substantially lower resistance.

In some embodiments, the structure 18 may be formed from several work pieces, e.g., more than the two work pieces 18A, 18B. In some embodiments, the work pieces 18A, 18B may be made from the same materials. In some embodiments, the work pieces 18A, 18B may be made from different materials.

In a further embodiment, the fastener assembly 10 disclosed herein has the capability of being installed in composite, metallic, or composite/metallic structures. For example, the fastener assembly 10 could be installed in, for example, graphite composites, titanium, aluminum, or a mixture of these components.

For example, composite and/or metal-composite materials may include:

1) fiber-reinforced polymers or FRPs include wood (comprising cellulose fibers in a lignin and hemicellulose matrix), carbon-fiber reinforced plastic or CFRP, and glass-reinforced plastic or GRP;

2) thermoplastic composites, short fiber thermoplastics, long fiber thermoplastics or long fiber-reinforced thermoplastics (thermoset composites that may incorporate aramid fiber and carbon fiber in an epoxy resin matrix);

3) shape memory polymer composites, which are high-performance composites, formulated using fiber or fabric reinforcement and shape memory polymer resin as the matrix (shape memory composites typically have the ability to be easily manipulated into various configurations when they are heated above their activation temperatures and will exhibit high strength and stiffness at lower temperatures; they can also be reheated and reshaped repeatedly without losing their material properties);

4) composites that include metal fibers for reinforcing other metals, as in metal matrix composites or MMC;

5) thermoplastic composite materials formulated with specific metal powders resulting in materials with a density range from 2 g/cm$^3$ to 11 g/cm$^3$ (same density as lead) (e.g. High Gravity Compounds (HGC)); and 6) engineered wood such as plywood, oriented strand board, wood plastic composite (recycled wood fiber in polyethylene matrix), Pykrete (sawdust in ice matrix), plastic-impregnated or laminated paper or textiles, Arborite, Formica (plastic) and Micarta; other engineered laminate composites, such as Mallite, using a central core of end grain balsa wood, bonded to surface skins of light alloy.

In some embodiments, the fastener assembly 10 may be applied to join structures in numerous representative applications, including but not limiting to:

1) high-performance products that need to be lightweight, yet strong enough to take harsh loading conditions (e.g. aerospace components (tails, wings, fuselages, propellers), boat and scull hulls, bicycle frames and racing car bodies);

2) launch vehicles and spacecraft (based on carbon composites);

3) solar panel substrates, antenna reflectors and yokes of spacecraft;

4) all-composite military High Mobility Multi-purpose Wheeled Vehicle (HMMWV or Hummvee); and 5) military transit cases made from carbon composites and Kevlar.

In some embodiments, the low fiction dielectric coating is selectively applied to certain portions of the core pin 12 prior to the fastener assembly 10 being installed to obtained result of selective conductivity between portions of the fastener assembly 10 in the installed condition. In some embodiments, the low fiction dielectric coating and another coating (e.g. wax or similar coatings) are selectively applied to certain portions of the core pin 12 prior to the fastener assembly 10 being installed to obtained result of selective conductivity between portions of the fastener assembly 10 in the installed condition. In some embodiments, the low fiction dielectric coating is selectively applied to certain portions of the core pin 12, after the fastener is installed to obtained result of selective conductivity between the portions of the fastener assembly 10 in the installed condition. In some embodiments, the low fiction dielectric coating is selectively applied to certain portions of the core pin 12 prior or after the fastener assembly 10 is being installed and/or applied to an internal surface of the locking member 30 as to obtain result of selective conductivity between portions of the fastener assembly 10 in the installed condition.

FIG. 2B illustrates an alternate embodiment of the installed core pin 12 of FIGS. 1 and 2A. The main difference between the embodiments of FIGS. 2A and 213 is associated with the transition zones 26 and 26'. In the embodiment of FIG. 2A, the transition zone 26 tapers from the apex 28 to the locking portion 24. In the embodiment of FIG. 2B, the transition zone 26', which begins with the apex 28', actually starts tapering from a position 32', while the portion of the transition zone 26' between the apex 28' and the position 32' has the same shape as the shank portion 16' of the core pin 12'. As detailed above, in both embodiments, all portions of the transition zones 26 and 26' are coated with the dielectric low friction coating 20 and 20' prior to the installation of the core pins 12 and 12'.

FIGS. 3A-3C illustrate an installation sequence for some embodiments of sleeved fasteners of the instant invention. In another embodiment, an intimate electrical contact is formed between the sleeve and the interference-fit core pin, in order to mitigate internal arcing between the two. As shown by FIGS. 3A-3C, a sleeved fastener assembly 110 includes a core pin 112 and a sleeve 114 with electrical conductivity between the sleeve 114 and a shank portion 116 of the core pin 112 which corresponds to a structure 118 formed by work pieces 118A and 118B.

In some embodiments, the work pieces 118A and 118B are made from the same material. In some embodiments, the work pieces 118A and 118B are made from different materials. In some embodiments, at least one of the work pieces 118A and 118B is made from a composite material. In some embodiments, at least one of the work pieces 118A and 118B is made from a metal material. In some embodiments, at least one of the work pieces 118A and 118B is made from a metal-composite material.

In an embodiment, the portion of the core pin 112 which corresponds to the structure 118 is not coated with the dielectric, low friction coating 120, while locking portion 124 of core pin 112 which does not correspond with the structure 118 is selectively coated with a dielectric, low friction coating 120.

The core pin 112 also includes a locking portion 124 and a frangible portion 123 axially aligned with the smooth cylindrical shank portion 116. The frangible portion 123 includes a pull groove portion 125 having circumferential pull grooves 127 adapted to be gripped for applying a relative axial force to pull the core pin 112 into the sleeve 114. The core pin 112 includes a breakneck groove 129 between the locking portion 124 and the frangible portion 123. As the fastener assembly 110 is installed, the frangible portion 123 is separated at the breakneck groove 129.

In other embodiments, the fastener assembly 110 further comprises a sleeve 114 and a clamping means to secure together workpieces. The clamping means may comprise a locking member 130, such as a collar or nut member or any other means suitable to fasten the workpieces together with the core pin 112 and the sleeve 114. The fastener assembly 110 is installed through aligned holes located in two or more of the work pieces 118A, 118B. In some embodiments, one of the holes through one of the work pieces 118A, 118B includes a countersink, or lead in radius, on its outer opening.

In an illustrative example, the locking member 130 is a collar adapted to be fit over the locking portion 124 of the core pin 112. The collar 130 includes a counterbore to enable the collar 130 to provide clearance over the sleeve 114, and an annular flange portion at one end for engagement with the other outer surface of the work piece 118B. The collar 130 includes an enlarged cylindrical shank portion having a uniform outside diameter adapted to be swaged into the locking portion 124 of the core pin 112. In another embodiment, the locking member 130 is a nut member adapted to engage the locking portion 124 of the core pin 112. More particularly, the nut member 130 includes a counterbore to enable the nut member 130 to provide clearance over the sleeve 114, and an annular flange portion at one end for engagement with the other outer surface of the workpiece 118B. The nut member 130 includes a threaded portion to be threaded onto the locking portion 124 of the core pin 112 to secure the fastener assembly 110 to the workpieces 118A and 118B.

FIGS. 4A and 4B show simulations of the current density distribution in the structure (18, 118) comparing a core pin (12,112) that is substantially fully coated with dielectric and the core pin (12,112) that is not substantially fully coated (i.e., selectively coated as described above). As it can be seen in FIGS. 4A and 4B, most of the current was transferred to the structure (18, 118) within less than about 1 micro second for the substantially uncoated core (selectively coated) pin (12, 112) whereas there is almost no current transfer with the substantially fully coated pin (12,112).

For example, referring to FIG. 4A, in an area 427 of the structure (18, 118), which corresponds to the shank portion of the pin of the fastener that has not been selectively coated with dielectric, low friction coating in the transition and locking portions of the pin. The measured current density of the area 427 is between about 6 to 8.2 units on the current density scale (i.e. there is substantially no transfer of current into the structure). In another example, referring to FIG. 4B, in an area 429 of the structure (18, 118), which corresponds to the shank portion (16, 116) of the core pin (12, 112) of the fastener assembly (10, 110) that has been selectively coated with dielectric, low friction coating in the transition portion (26, 126) and locking portion (24, 124) of the pin. The measured current density of the area 429 is almost fully below 4 units on the current density scale (i.e. there is substantial transfer of current into the structure).

Figure 5:
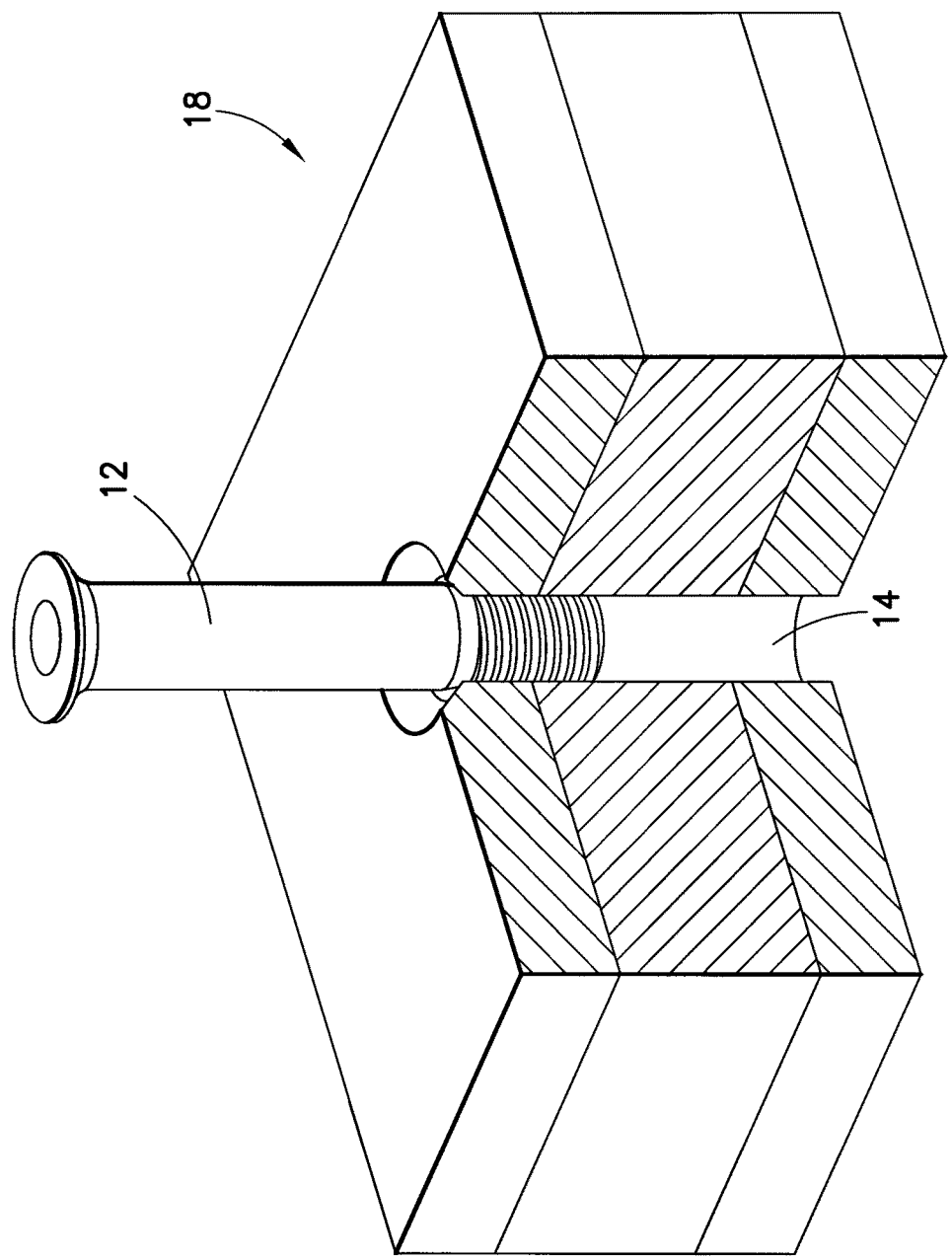
FIG. 5 is a partial cross-sectional view showing the insertion of an interference fit pin into a sleeved hole.

In some embodiments, the insertion of an interference fit pin into a sleeved hole, as shown in FIG. 5 can be considered a forming/extrusion process, with the core pin (12) acting as a punch, a hole of the structure (18) acting as a die, and the sleeve material (14) being compressed between the two.

Figure 6A:
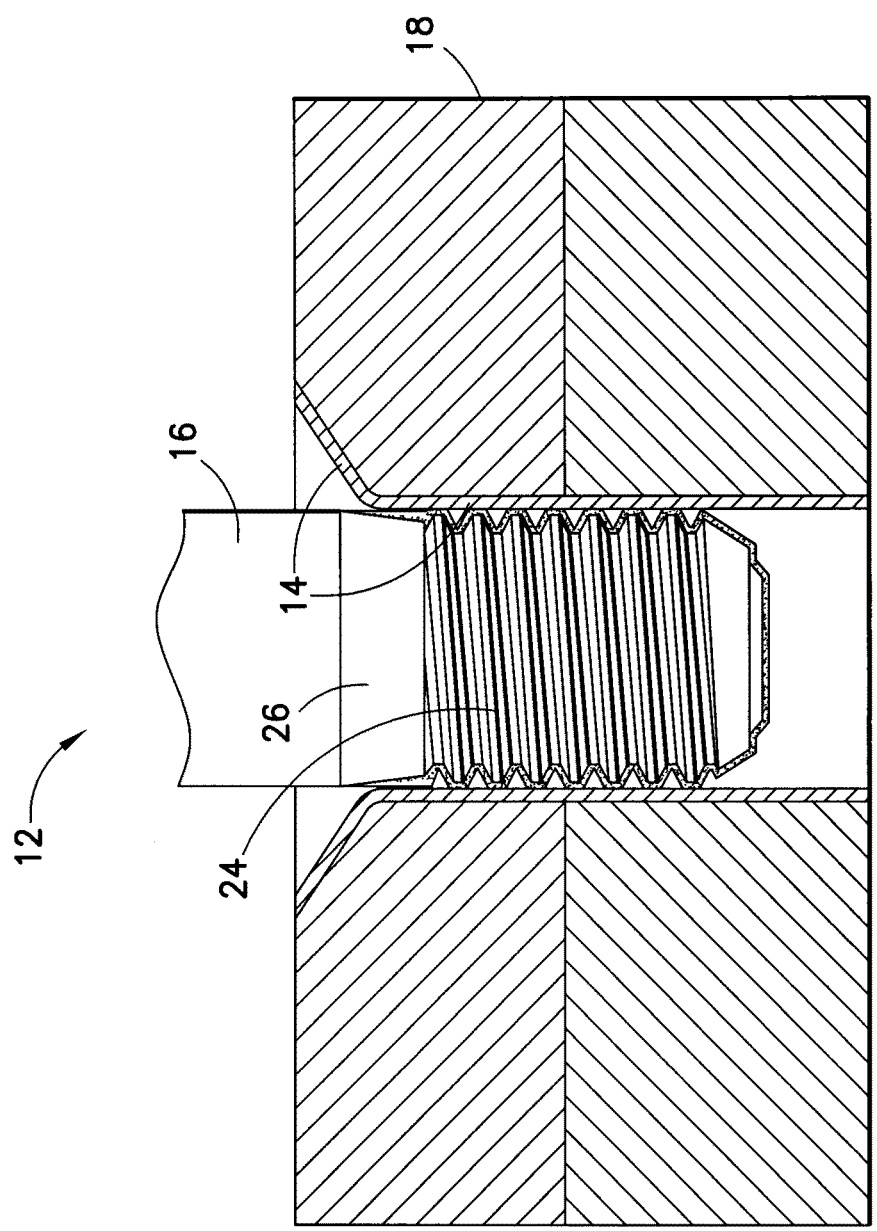
FIGS. 6A and 6B are partial cross-section views showing a thread zone of embodiments of the pin in the sleeved hole shown in FIG. 5.
Figure 6B:
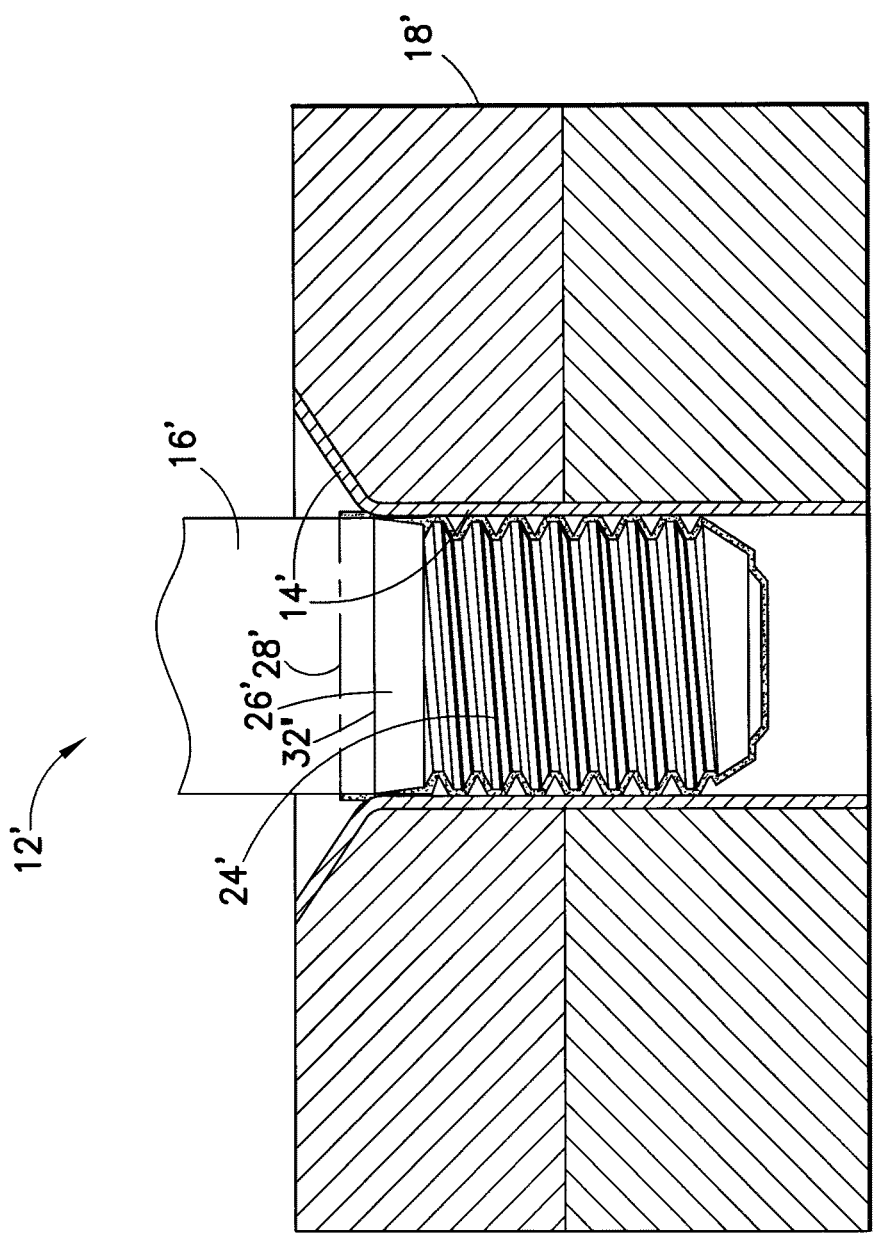

In some embodiments, as shown in embodiments FIGS. 6A and 6B, during the insertion process, the locking portion (24, 24', 124) doesn't interfere with the sleeve (14, 14', 114) and thus it doesn't play a role in its expansion. As the core pin (12,12',112) is further inserted, the transition zone (26,26', 126) is a first pin zone that interferes with the sleeve (14, 14', 114). This interference causes the sleeve (14,14',114) to displace radially, creating compression against hole walls of the structure (18,18',118). In some embodiments, once the shank portion (16,16', 116) of the core pin (12,12',112) makes contact with the sleeve (14,14',114), it is only exposed to the system springback, since the sleeve (14,14',114) is already completely conformed against the structure (18,18',118). In some embodiments, the springback pressure on the shank (16,16',116), associated with the interface coefficient of friction and the area of contact, governs the total force required for the insertion.

In some embodiments, the transition zone (26,26',126) plays a very important role in the sleeve (14,14',114) expansion. In some embodiments, the configuration of the transition zone (26,26',126) may affect both mechanical characteristics and lightning strike performance of the fastening system. When the transition zone (26,26',126) is pushing the sleeve (14,14',114) material outwards against the hole wall of the structure (18,18',118), the pressure generated promotes radial expansion of the hole, compression of the core pin (12,12', 112) and thickness reduction of the sleeve (14,14', 114). In one example, the pressure generated during the installation process may also promote axial (i.e. outward, along direction of the pin movement) expansion of the sleeve (14,14',114), since part of its material is forward extruded during the installation process.

Figure 7A:
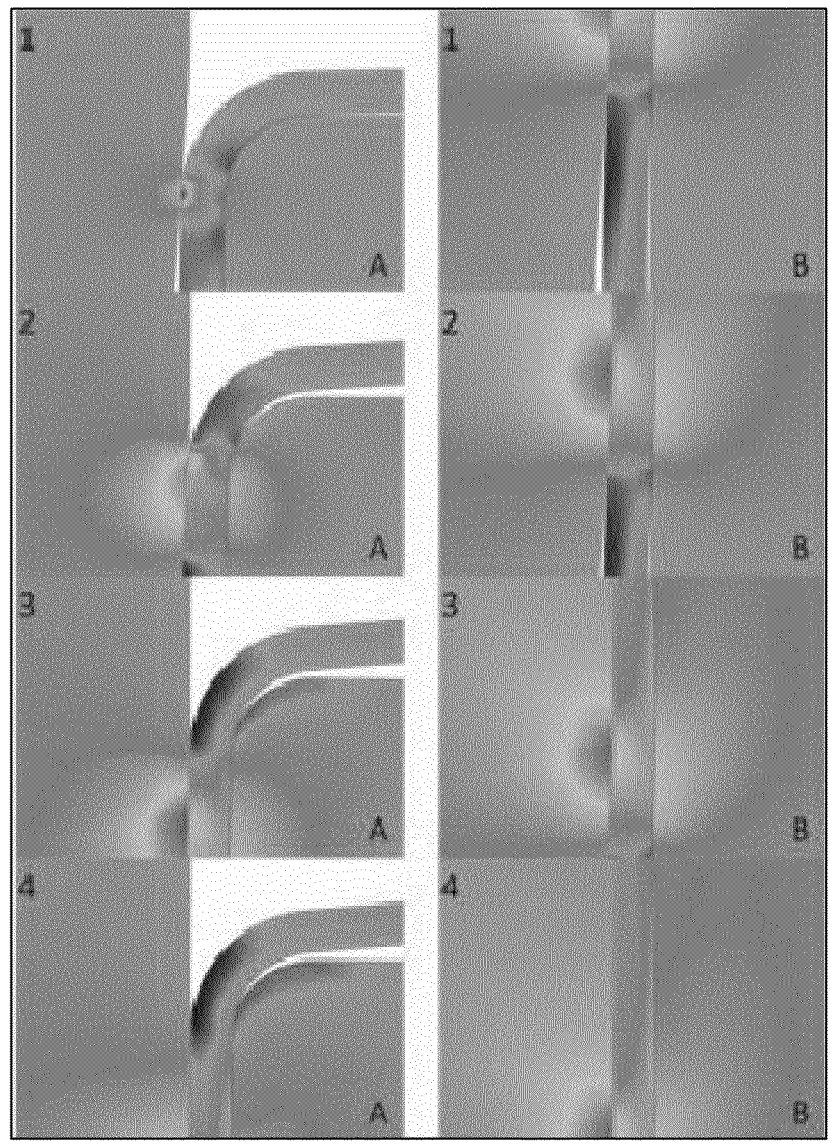
FIGS. 7A and 7B show hydrostatic pressure distribution caused by a passage pin thread transition zone in two different areas of a structure hole.
Figure 7B:
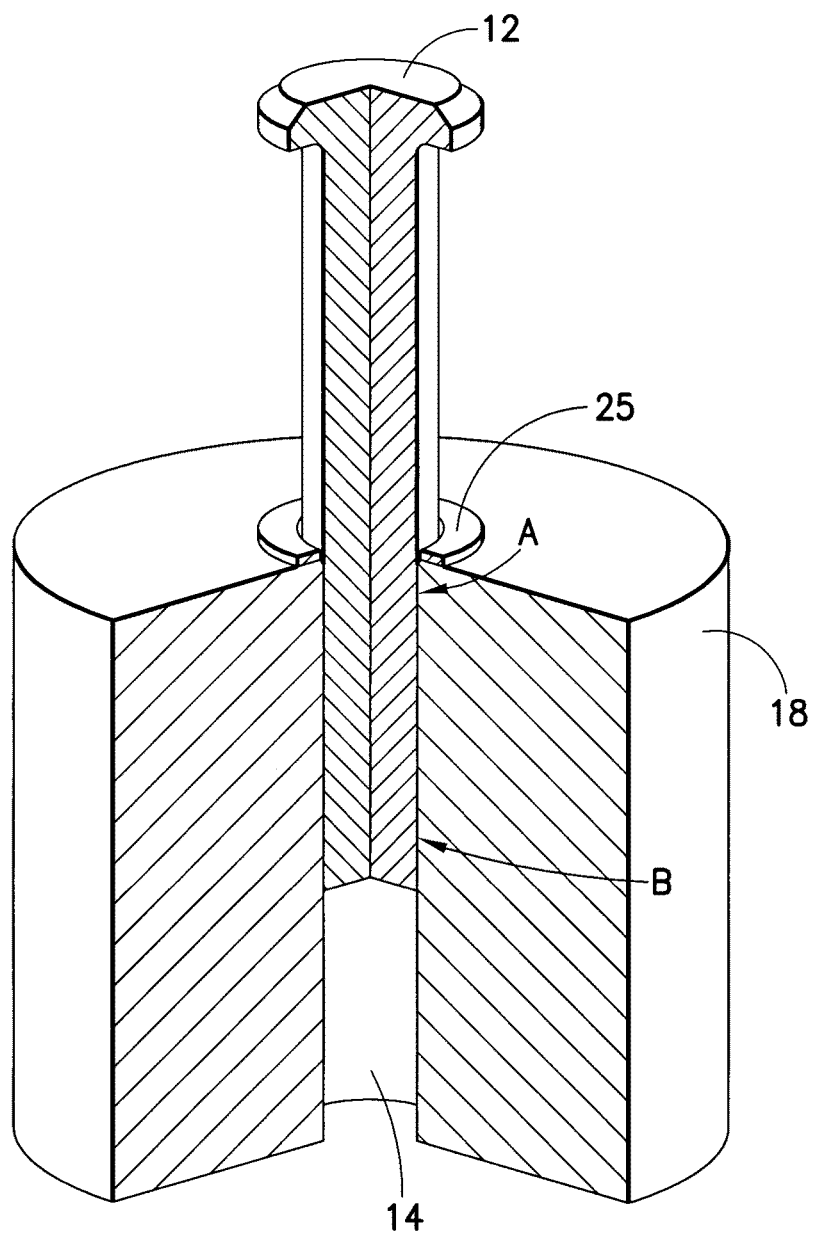

FIG. 7A illustrates some examples of a sequence of a hydrostatic pressure distribution caused by the passage of the core pin (12,12',112) transition zone (26,26',126) in two different areas of the hole of the structure (18,18',118), as shown by FIG. 7B. In FIGS. 7A and 7B, the area A is the area that is closer to the sleeve (14, 14',114) collar 25. In FIGS. 7A and 7B, the area B is the area that is about half way through the structure (18, 18',118). FIG. 7A shows that higher pressure happens when the area of larger diameter on the pin thread transition zone is compressing and pushing the sleeve (14,14', 114) material against the structure (18,18',118). In some embodiments, the maximum pressure magnitude remains relatively constant throughout the whole insertion process.

Figure 8B:
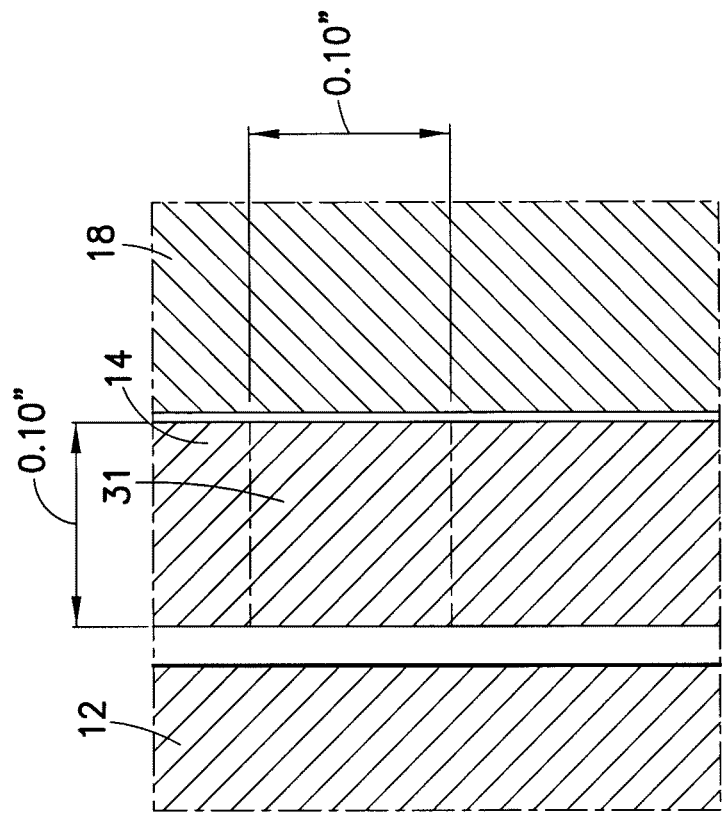
FIGS. 8A and 8B show a cross-sectional view of a sleeved fastener that is about to be inserted in a structure hole, and an illustration of a control volume of sleeve material in the form of a ring that is one thickness wide by one thickness high.
Figure 8A:
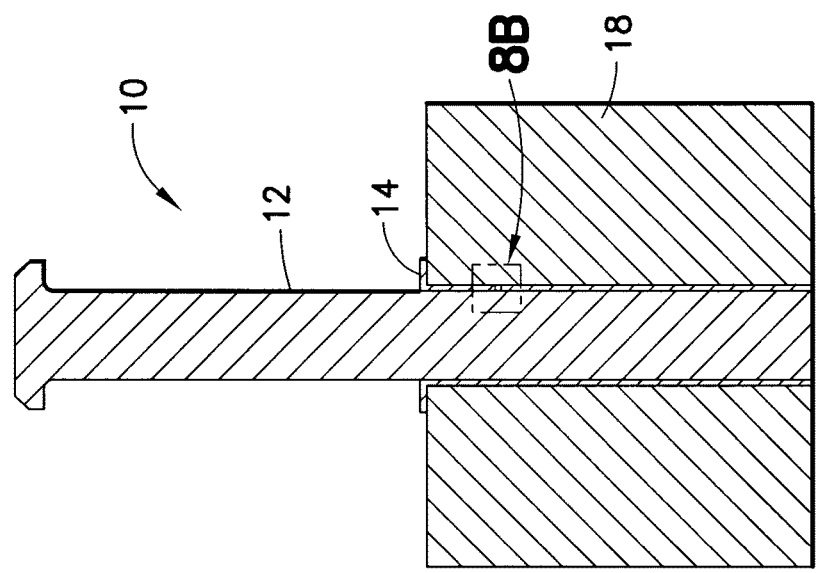

FIG. 8A illustrates an example of the cross section of a sleeved fastener assembly (10, 10',110), having a core pin (12, 12',112) and a sleeve (14, 14',114), that is about to be inserted in a hole of the structure (18, 18',118). FIG. 8B shows a portion of the core pin (12, 12',112), a portion of the hole wall of the structure (18, 18',118), and a portion of the sleeve (14, 14',114), represented by a square (31) which is a control volume of sleeve material in the form of a ring that is one hundreds of inch thickness wide by one hundreds of inch thickness high.

Figure 9:
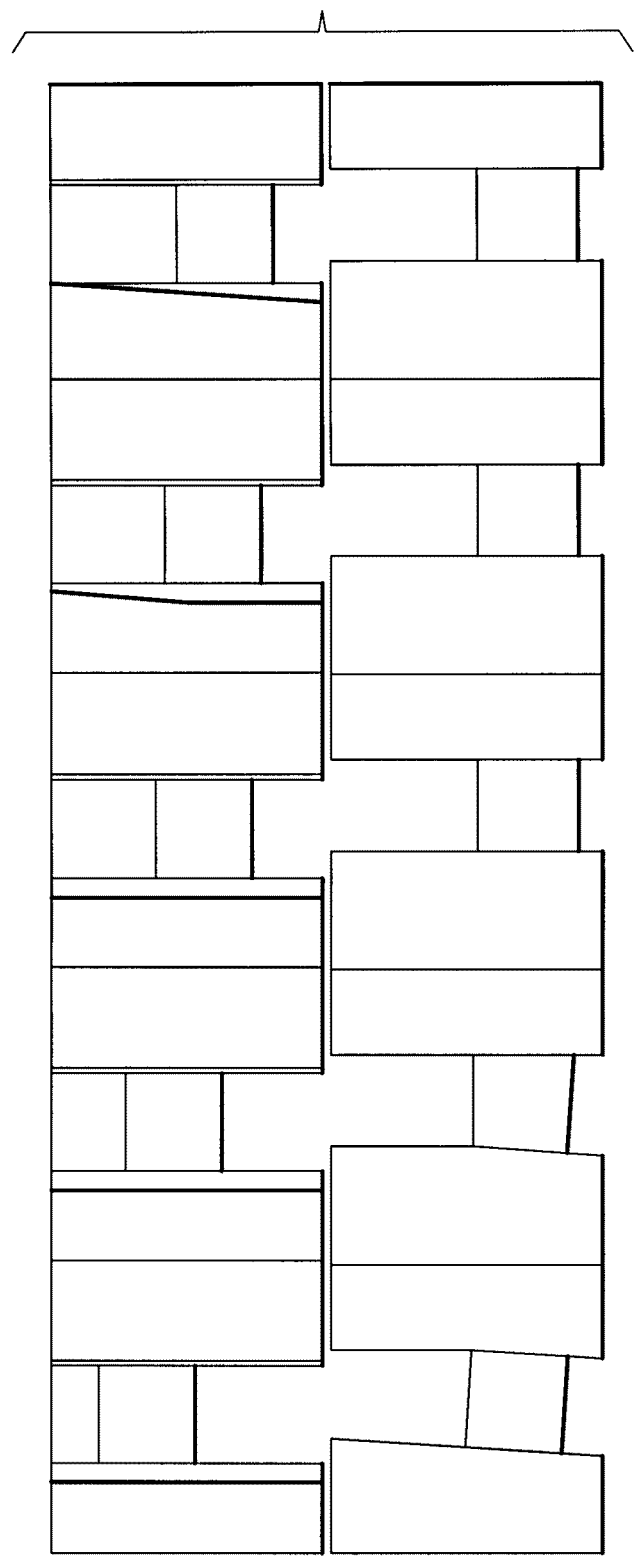
FIG. 9 illustrates a sequence of the evolution of hydrostatic pressure in a sleeve volume control ring.
Figure 10:
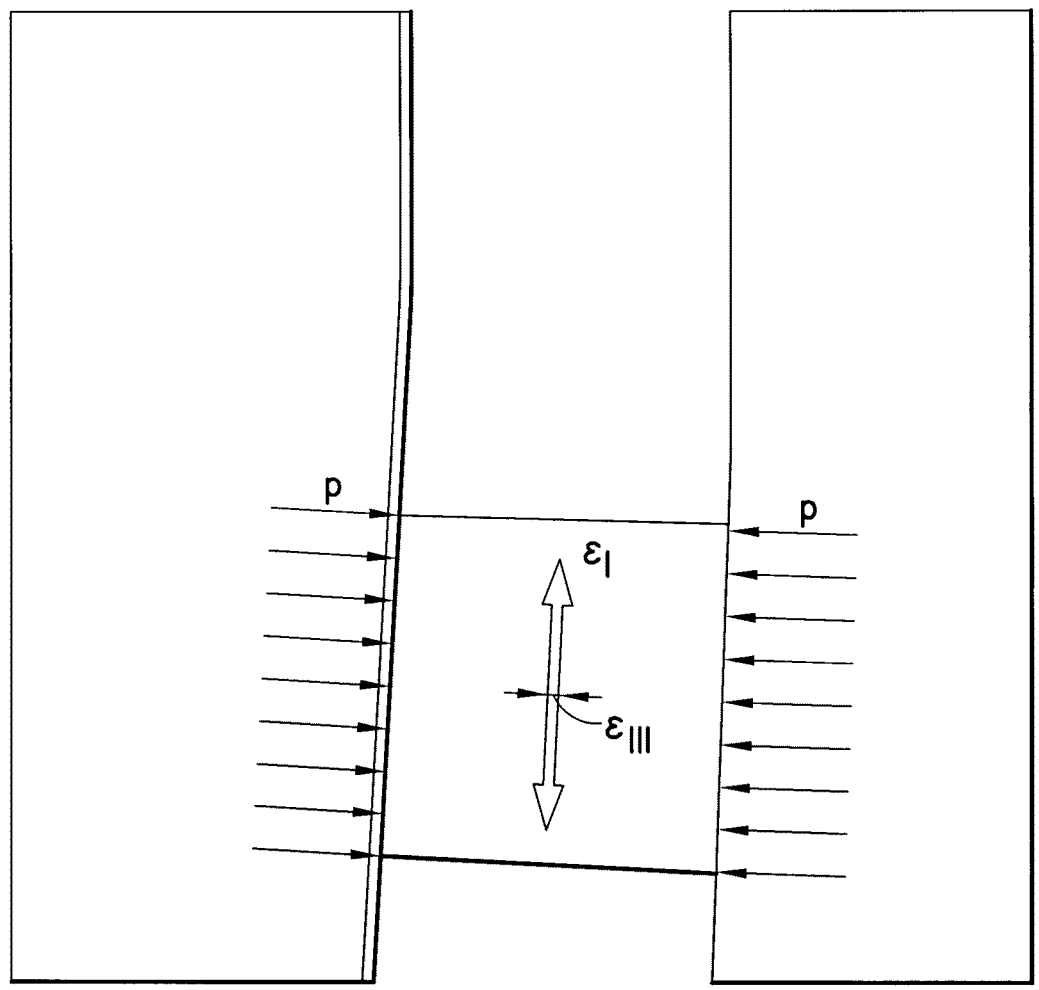
FIG. 10 is a strain tensor plot of sleeve material that is compressed radially and stretched axially.

In some embodiments, following the displacement of the this ring and evaluating the hydrostatic pressure evolution during the insertion process, as shown in FIG. 9, it can be seen that, as soon as the control volume is "pinched" between the pin thread transition zone and the structure, the hydrostatic pressure raises significantly. At this stage, the sleeve material is compressed radially and stretched axially. Following the path of least resistance, most of the sleeve volume that is displaced radially is then forward extruded, as illustrated by the strain tensor plot shown in FIG. 10.

In one embodiment, the thread transition zone is (or has to be) configured in such a way that maximizes the amount of radial expansion applied to the hole, while minimizing the sleeve forward extrusion. In yet another embodiment, the thread transition zone during the insertion has a capability of expelling the excess of sealant entrapped between the sleeve OD (outside diameter) and the hole ID (inside diameter). Test data has shown that the excessive presence of sealant between the sleeve and the structure is the principal cause of arcing in this area during a lightning strike event. In one example, the thread transition zone configuration may promotes the maximum removal of sealant during the insertion process.

It will be understood that the fastener assembly described herein is merely exemplary and that a person skilled in the art may make many variations and modifications without departing from the full spirit and the scope of the embodiments described herein. For example, any steps may be performed in any desired order (and any desired steps may be added and/or any desired steps may be deleted). Accordingly, all such variations and modifications are intended to be included within the scope of the present invention.

We claim:

1. A sleeve interference fastener adapted to be installed in a hole of a structure comprising:
   a.) a sleeve having a head at one end and a tubular portion, the tubular portion having an inner diameter and an outer diameter, wherein the outer diameter of the tubular portion is less than an inner diameter of the hole of the structure;
   b.) a pin member having a pin head at one end, a locking portion at an opposite end, and a shank portion intermediate the pin head and the locking portion,
      i) wherein the shank portion, located below the pin head, has a diameter greater than the inner diameter of the tubular portion of the sleeve,
      ii) wherein the pin member has a transition zone between the shank portion and the locking portion, and
      iii) wherein the locking portion of the pin member and the transition zone of the pin member are coated with a low friction dielectric coating and the shank portion of the pin member is free from the low friction dielectric coating;
   c.) a locking member adapted to fit over the locking portion of the pin member;
   d.) wherein the sleeve is adapted to expand radially over the shank portion of the pin member to form an interference fit between the outer diameter of the sleeve and the hole of the structure so as to provide an installed position;
   e.) wherein, in the installed position, a first interface between the shank portion of the pin member and the inner diameter of the sleeve is substantially free from the low friction dielectric coating; and
   f.) wherein, in the installed position, the transition zone of the pin member and a second interface between the locking portion of the pin member and the locking member are substantially covered with the low friction dielectric coating.

2. The sleeve interference fastener of claim 1, wherein the pin member and the sleeve member are sufficiently adapted to result in: (i) a coefficient of friction between a shank contact surface of a surface of the inner diameter of the sleeve and the shank portion of the pin member having X, (ii) a coefficient of friction between a surface of the outer diameter of the sleeve and the inner diameter of the hole of the structure having Y, and (iii) wherein X is consistently maintained less than Y when the shank portion of the pin member is moved within the sleeve to achieve the installed position.

3. The sleeve interference fastener of claim 1, wherein the locking member is a collar.

4. The sleeve interference fastener of claim 3, wherein the locking member comprises a counterbore portion, wherein the counterbore portion is adapted to fit over the locking portion of the pin member and compress the sleeve around the pin member.

5. The sleeve interference fastener of claim 1, wherein, in the installed position, the interference fit of the fastener with the structure, having the hole in which the sleeve interference fastener is adapted to be installed, is about 0.0005 inches to about 0.0100 inches.

6. The sleeve interference fastener of claim 1, wherein the shank portion of the pin member is cylindrical.

7. The sleeve interference fastener of claim 1, wherein the structure, having the hole in which the sleeve interference fastener is adapted to be installed, is a metallic-composite structure.

8. The sleeve interference fastener of claim 1, wherein the fastener is made from at least one material selected from the group consisting of aluminum, titanium, and steel.

9. The sleeve interference fastener of claim 1, wherein the low friction dielectric coating includes a surface resistivity of about $1 \times 10^{10}$ $\Omega$/Sq to about $1 \times 10^{\wedge}$ $\Omega$/Sq.

10. The sleeve interference fastener of claim 1, wherein a thickness of the low friction dielectric coating in the transition zone and the second interface is within a range of about 0.0003 inch to about 0.0006 inch.

11. The sleeve interference fastener of claim 1, wherein a friction coefficient of the low friction dielectric coating is in a range of about 0.25 to about 0.44.

12. The sleeve interference fastener of claim 1, wherein the shank portion of the pin member is coated with at least one masking material that protects the shank portion from being coated with the low friction dielectric coating.

13. The sleeve interference fastener of claim 12, wherein the at least one masking material on the shank portion of pin member comprises a metal material.

* * * * *

UNITED STATES PATENT AND TRADEMARK OFFICE
CERTIFICATE OF CORRECTION

PATENT NO. : 8,475,102 B2  Page 1 of 1
APPLICATION NO. : 12/908347
DATED : July 2, 2013
INVENTOR(S) : Luke Haylock et al.

It is certified that error appears in the above-identified patent and that said Letters Patent is hereby corrected as shown below:

In the Specification:

Column 1, line 23, delete "lighting" and insert -- lightning --;

Column 4, line 42, delete "fiction" and insert -- friction --;

Column 4, line 47, delete "fiction" and insert -- friction --;

Column 4, line 51, delete "fiction" and insert -- friction --;

Column 4, line 55, delete "fiction" and insert -- friction --;

Column 7, line 22, delete "fiction" and insert -- friction --;

Column 8, line 37, delete "limiting" and insert -- limited --;

Column 8, line 50, delete "fiction" and insert -- friction --;

Column 8, line 55, delete "fiction" and insert -- friction --;

Column 8, line 60, delete "fiction" and insert -- friction --;

Column 8, line 65, delete "fiction" and insert -- friction --;

Column 11, line 52, delete "promotes" and insert -- promote --.

Signed and Sealed this
Twenty-ninth Day of October, 2013

Teresa Stanek Rea
*Deputy Director of the United States Patent and Trademark Office*